125,714

UNITED STATES PATENT OFFICE.

CHARLES S. ALLEN, OF NEW YORK, N. Y.

IMPROVEMENT IN MEDICAL COMPOUNDS OR PHOSPHATED CANDIES.

Specification forming part of Letters Patent No. 125,714, dated April 16, 1872.

Specification describing a new and useful Improvement in Medical Compounds, invented by CHARLES SUMNER ALLEN, of the city of New York, in the county and State of New York.

This invention consists in combining any of the salts and acids of phosphorus with candies, sugars, and saccharine compounds in a solid form for medicinal purposes, substantially as hereinafter described.

One method of carrying out my invention is as follows: To one ounce, avoirdupois, of any candy-drops—preferably, ordinary small lemon-drops—use eighty minims of officinal dilute phosphoric acid evaporated to one-sixteenth its bulk, in which acid dissolve double its weight of best white sugar. Allow this phosphoric-acid sirup to cool, then stir in the lemon-drops so that they are evenly covered with the acid-sirup; now roll the wet lemon-drops in pulverized sugar and throw them on a sieve to separate any excess of sugar not properly adhering to the drops. Three of these drops represent one dose of the officinal phosphoric acid dilute. By varying the proportions of acid any required number of lemon-drops may represent a dose.

In order to make cordial-drops containing phosphoric acid I manufacture hollow confectionery-drops in the usual manner, and the interior thereof I fill with the above-described sirup of phosphoric acid. In order to make a compound containing phosphate of iron I take two ounces of white sugar, dissolve it in as small a quantity of boiling water as possible, add twenty-six grains of phosphate of protoxide of iron, and mix thoroughly. Continue heating until a portion dropped in cold water becomes hard, but not brittle. Pour into warm candy-molds of the usual form. The proportions of sugar and iron can be made to vary if necessary.

The above method can be adopted for any phosphate which is insoluble in water.

I do not limit or confine myself to the exact quantities of the ingredients herein mentioned, nor to the specific forms of phosphorus herein described, as these may be varied at the will of the manufacturer; but What is here claimed, and desired to be secured by Letters Patent, is—

A medical compound, made by combining one or more of the acids or salts of phosphorus with candy, sugar, or other saccharine substances in a solid form, substantially as set forth.

CHARLES S. ALLEN.

Witnesses:
T. B. MOSHER,
GEO. W. MABEE.